P. A. ALT.
LOCK NUT.
APPLICATION FILED APR. 19, 1909.
954,010.
Patented Apr. 5, 1910.
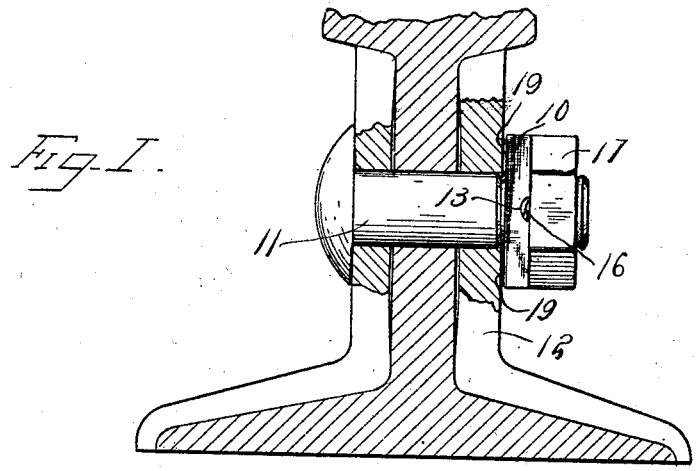
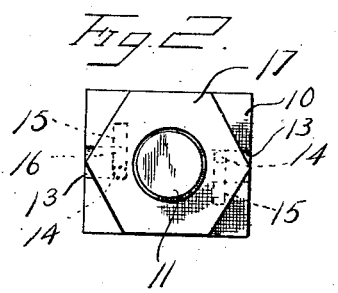
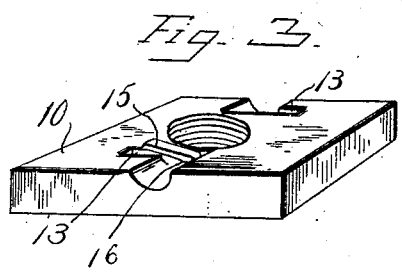
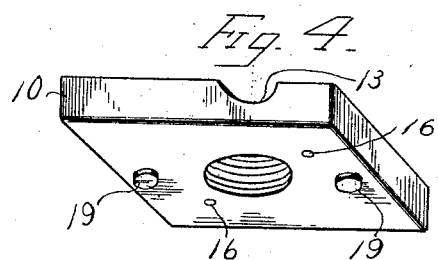
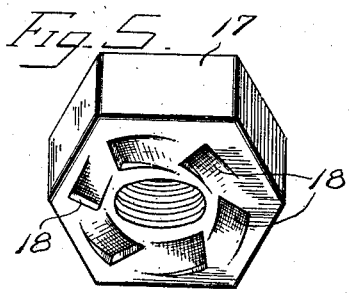
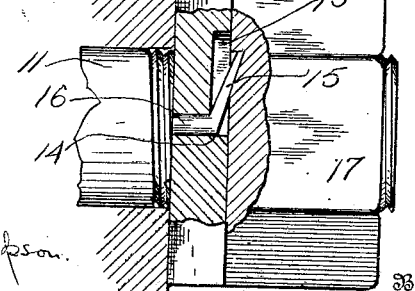
Inventor
Philip A. Alt.
Witnesses
J. C. Simpson
C. N. Woodward
By
Attorneys ced copy

UNITED STATES PATENT OFFICE.

PHILIP A. ALT, OF MARION, INDIANA.

LOCK-NUT.

954,010.  Specification of Letters Patent.  Patented Apr. 5, 1910.

Application filed April 19, 1909. Serial No. 490,845.

*To all whom it may concern:*

Be it known that I, PHILIP A. ALT, a citizen of the United States, residing at Marion, in the county of Grant, State of Indiana, have invented certain new and useful Improvements in Lock-Nuts; and I do hereby declare the following to be a full, clear, and exact description of the invention, such as will enable others skilled in the art to which it appertains to make and use the same.

This invention relates to improvements in lock nuts, and has for one of its objects to improve the construction and increase the efficiency and utility of devices of this character.

With this and other objects in view, the invention consists in certain novel features of construction as hereafter shown and described and then specifically pointed out in the claim, and in the drawings illustrative of the preferred embodiment of the invention, Figure 1 is a side elevation of the improvement applied. Fig. 2 is a plan view of the nut and washer. Fig. 3 is a perspective view of the washer from above. Fig. 4 is a perspective view of the washer from beneath. Fig. 5 is a perspective view of the nut from below. Fig. 6 is a section on the line 6—6 of Fig. 2.

The improved device comprises in general a washer through which a bolt extends and a nut engaging the bolt and bearing upon the washer, the washer being provided with one or more resilient pawls and the nut provided in its inner face with one or more ratchet shaped recesses adapted to be engaged by the pawl.

The washer is indicated by the character 10, and the bolt represented at 11, and the structure through which the bolt extends, for illustration a railway rail clamp plate 12.

The washer may be of any required form, but for the purpose of illustration is shown square, and is provided with two L-shaped recesses 13 in its outer face, one portion of each recess opening outwardly through the adjacent side of the washer, as shown in Fig. 3. Leading downwardly from each recess at its "elbow" is an aperture 14.

The recesses 13 are designed to receive resilient pawl devices 15, each pawl having a stud 16 fitting in the apertures 14 and supported in position thereby within the inner portion of the recesses, as shown. The pawls 15 are reduced toward their free ends, as shown and project at their free ends normally above the upper face of the washer. The recesses 13 are arranged in reverse order, so that the pawls extend in opposite directions as shown.

The nut is represented at 17, and may be of any of the usual forms, but for the purpose of illustration is shown of the ordinary hexagon construction, and is provided with a plurality of ratchet shaped depressions 18 in its inner face, the depressions adapted to be engaged by the pawls 15 when the nut is turned "home" upon the bolt 11, and thus effectually prevent it from retrograde movement. It will thus be noted that a very simply constructed and efficacious lock nut is produced, which may be inexpensively manufactured, and applied to bolts of various sizes, and to bolts employed for various purposes, but is more particularly applicable to the clamp nuts of railway rail joints, and for the purpose of illustration is thus applied, as before noted.

To more firmly support the washer, and prevent any tendency to rotative movement, the face of the washer opposite to that in which the recesses 13 are located is provided with a plurality of spurs 19 which bear upon the supporting structure.

The nut will thus be held firmly in position against any tendency to retrograde movement no matter how severe may be the jars and concussions to which the supporting structure may be subjected.

As before stated the apertures 14 are located at the "elbows" of the L-shaped recesses 13, and the portions 15 of the pawls are inclined relative to the side faces of the washer and of the nut, so that spaces remain between the pawls at the juncture of the portions 15—16 and the face of the nut, and when occasion arises for the release of the nut, the pawl 15 can be depressed by a suitable implement inserted through the outwardly opening portions of the aperture 13 and forced between the pawl and the nut, as will be obvious. In this manner the pawls may be released without destroying them, so that they can be repeatedly employed.

What is claimed is:—

In a lock nut a washer having an L-shaped recess in one face with one portion of said recess opening through the washer at the side and with an aperture leading from the recess at its elbow, a resilient pawl decreasing in thickness toward its free end and engaging in said recess, the outer face of said pawl being inclined to the plane of the side face of the washer whereby a space is left between the pawl and the bottom of the recess, a stud extending from the pawl into the said aperture, and a nut having recesses in its inner face into which said pawl enters, the free end of said pawl adapted to be depressed and released from the nut by inserting an implement through the outer portion of the recess and applying it to the pawl.

In testimony whereof, I affix my signature, in presence of two witnesses.

PHILIP A. ALT.

Witnesses:
    MARY A. ALT,
    REGINA C. ALT.